US012541732B2

(12) United States Patent
Schmidt et al.

(10) Patent No.: US 12,541,732 B2
(45) Date of Patent: Feb. 3, 2026

(54) SYSTEM AND METHOD OF MACHINE VISION ASSISTED TASK OPTIMIZATION

(71) Applicant: Verizon Patent and Licensing Inc., Basking Ridge, NJ (US)

(72) Inventors: Caroline Gallrein Schmidt, Chicago, IL (US); Minkyung Kim, Berkeley Heights, NJ (US); Connor Pencek, Burke, VA (US); Anthony Gil Aguila, Princeton, NJ (US); Mark Romanak, Lone Tree, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 262 days.

(21) Appl. No.: 17/489,544

(22) Filed: Sep. 29, 2021

(65) Prior Publication Data

US 2023/0103805 A1 Apr. 6, 2023

(51) Int. Cl.
*G06Q 10/0639* (2023.01)
*G06V 20/52* (2022.01)
*G06V 40/20* (2022.01)

(52) U.S. Cl.
CPC ....... *G06Q 10/06395* (2013.01); *G06V 20/52* (2022.01); *G06V 40/23* (2022.01)

(58) Field of Classification Search
None
See application file for complete search history.

(56) References Cited

U.S. PATENT DOCUMENTS

| | | | |
|---|---|---|---|
| 5,740,388 A * | 4/1998 | Hunt ................... | G06Q 30/06 725/86 |
| 6,477,437 B1 * | 11/2002 | Hirota ................. | G06Q 10/10 700/95 |
| 10,791,301 B1 * | 9/2020 | Garcia Kilroy ....... | H04N 7/169 |
| 11,017,690 B1 * | 5/2021 | Zia ....................... | H04N 5/77 |
| 11,475,921 B1 * | 10/2022 | Jeyabalan ............. | G11B 27/06 |
| 2007/0264620 A1 * | 11/2007 | Maddix ................ | G09B 19/003 434/219 |
| 2019/0060752 A1 * | 2/2019 | Lee ....................... | A63F 13/213 |
| 2019/0156124 A1 * | 5/2019 | Singhal ................ | G06V 20/46 |
| 2019/0156691 A1 * | 5/2019 | Aguayo, Jr. .......... | G09B 7/02 |
| 2019/0213529 A1 * | 7/2019 | Donnelly ............. | G06F 16/532 |
| 2020/0167716 A1 * | 5/2020 | Otsu .................... | H04W 4/12 |
| 2020/0273243 A1 * | 8/2020 | Duffy .................. | G06T 17/10 |
| 2020/0312027 A1 * | 10/2020 | De Saeger ........... | G06F 3/011 |
| 2020/0372426 A1 * | 11/2020 | Keaton ................ | H04W 4/024 |
| 2020/0394589 A1 * | 12/2020 | Trivelpiece .......... | G06V 20/52 |
| 2021/0274093 A1 * | 9/2021 | Thurston, III ....... | H04N 23/90 |
| 2021/0366193 A1 * | 11/2021 | Goetgeluk ........... | G11B 27/031 |
| 2021/0373676 A1 * | 12/2021 | Jorasch ................ | A63F 13/215 |

(Continued)

*Primary Examiner* — Sara Grace Brown

(57) ABSTRACT

An exemplary system is configured to access data captured by one or more sensors in an industrial environment, the data comprising videos of operatives in the industrial environment. The system is further configured to determine, based on the data, a task performed by the operatives and to identify a video within the videos that represents a performance of the task comprising a variance from a reference performance of the task represented in a reference video associated with the task. The system is further configured to generate, based on the video and the variance, an output for improving the performance of the task or the reference performance of the task.

20 Claims, 7 Drawing Sheets

(56) References Cited

U.S. PATENT DOCUMENTS

| | | | | |
|---|---|---|---|---|
| 2021/0390485 A1* | 12/2021 | Lautz | ............... | G06Q 10/06315 |
| 2022/0021847 A1* | 1/2022 | Maggiore | .............. | G06V 20/52 |
| 2022/0292834 A1* | 9/2022 | DeSantola | ............... | H04N 7/18 |
| 2023/0052775 A1* | 2/2023 | Karri | .................... | G11B 27/031 |
| 2023/0162458 A1* | 5/2023 | Takaki | .................... | G06T 13/40 |
| | | | | 345/419 |

* cited by examiner

SYSTEM AND METHOD OF MACHINE VISION ASSISTED TASK OPTIMIZATION

BACKGROUND INFORMATION

Videos (e.g., training videos) may allow workers to learn how to perform tasks associated with their work. Such videos may be particularly useful in an environment where many tasks are performed, sometimes with substantial turnover in the workforce. However, generating such videos may be nontrivial and there remains room to improve such processes.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
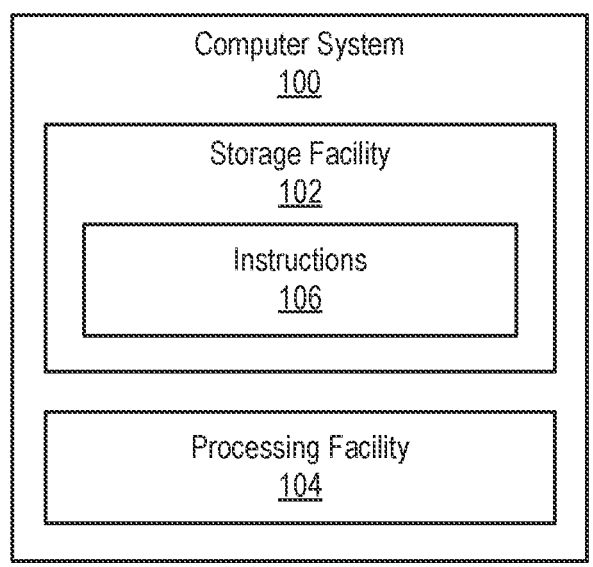
FIG. 1 illustrates an exemplary computer system for machine vision assisted task optimization according to principles described herein.

Systems and methods for machine vision assisted task optimization are described herein. In certain examples, an illustrative system may be configured to access data captured by one or more sensors in an industrial environment, the data comprising videos of operatives in the industrial environment. The system may determine, based on the data, a task performed by the operatives. The system may identify a video within the videos that represents a performance of the task comprising a variance from a reference performance of the task represented in a reference video associated with the task. The system may generate, based on the video and the variance, an output for improving the performance of the task and/or the reference performance of the task.

For example, in an industrial setting such as a factory floor, operatives may be provided training videos that instruct operatives how to perform tasks assigned to the operatives. As operatives perform the task, one or more operatives may perform the task at a higher performance level than the training video (e.g., a performance level that is higher, by at least a defined threshold, than a reference performance level associated with the training video). Such performance may be captured by sensors on the factory floor. The sensors may capture data (e.g., video data, location data, throughput data, etc.) that may be analyzed for performance metrics that determine the higher performance level. Based on the determination of the higher performance level of a particular operative, the system may generate a new training video based on the video data of the particular operative performing the task. The new training video may then be provided to other operatives for optimizing performance. This cycle may be repeated as operatives improve on performance relative to the new training video.

Conversely, one or more operatives may perform the task at a lower performance level (e.g., in an unsafe manner, inefficiently, etc.) than the training video (e.g., a performance level that is lower, by at least a defined threshold, than a reference performance level associated with the training video). The system may determine such a performance and provide feedback to the operative on how to improve the performance of the task.

Additionally, the system may optimize across a plurality of tasks, by performing task orchestration. For instance, the system may re-assign tasks to operatives based on determining that an operative has completed a task and that another task needs more allocated resources. These examples as well as additional examples of machine vision assisted task optimization are described in detail herein.

Systems and methods described herein provide one or more benefits and/or advantages over conventional technologies. As an example, systems and methods described herein may allow for continual and/or automated optimization of training videos so that performances of tasks are continually optimized. Further, resources may be optimally allocated across tasks based on data captured and analyzed by systems described herein.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary computer system 100 ("system 100") for machine vision assisted task optimization. System 100 may be implemented by any suitable computer system configured to perform one or more of the operations described herein. In certain examples, system 100 may be implemented by a computer system connected to a network, such as a MEC server that is integrated within a provider network and that employs MEC technology, 5G network technologies, a local network server, and/or other suitable technologies or combination of technologies that may enable system 100 to perform the operations described herein. In certain examples, system 100 may be implemented together with other systems, devices, and/or sensors (e.g., an image capture device, a monitoring device, etc.) within an environment that is configured to operate as a single, independent system. In other examples, system 100 may be implemented separately and may operate independently from other systems, devices, and/or sensors.

As shown, system 100 may include, without limitation, a storage facility 102 and a processing facility 104 selectively and communicatively coupled to one another. Facilities 102 and 104 may each include or be implemented by hardware and/or software components (e.g., processors, memories, communication interfaces, instructions stored in memory for execution by the processors, etc.). In some examples, facilities 102 and 104 may be distributed between multiple devices and/or multiple locations as may serve a particular implementation. For example, facilities 102 and 104 may be spread across multiple processors or other distinct computing resources within a local server, a MEC server, and/or any other suitable computing system which, as will be described below, may incorporate a plurality of various servers or other resources. Each of facilities 102 and 104 within system 100 will now be described in more detail.

Storage facility 102 may maintain (e.g., store) executable data used by processing facility 104 to perform any of the functionality described herein. For example, storage facility 102 may store instructions 106 that may be executed by processing facility 104. Instructions 106 may be executed by processing facility 104 to perform any of the functionality described herein, and may be implemented by any suitable application, software, code, and/or other executable data instance. Additionally, storage facility 102 may also maintain any other data accessed, managed, used, and/or transmitted by processing facility 104 in a particular implementation.

Processing facility 104 may be configured to perform (e.g., execute instructions 106 stored in storage facility 102 to perform) various functions associated with machine vision assisted task optimization. Examples of such operations are described herein.

In some examples, system 100 may be configured to operate in real time so as to access and process the data described herein as quickly as the data is generated or otherwise becomes available. As used herein, operations may be performed in "real time" when they are performed immediately and without undue delay.

Figure 2:
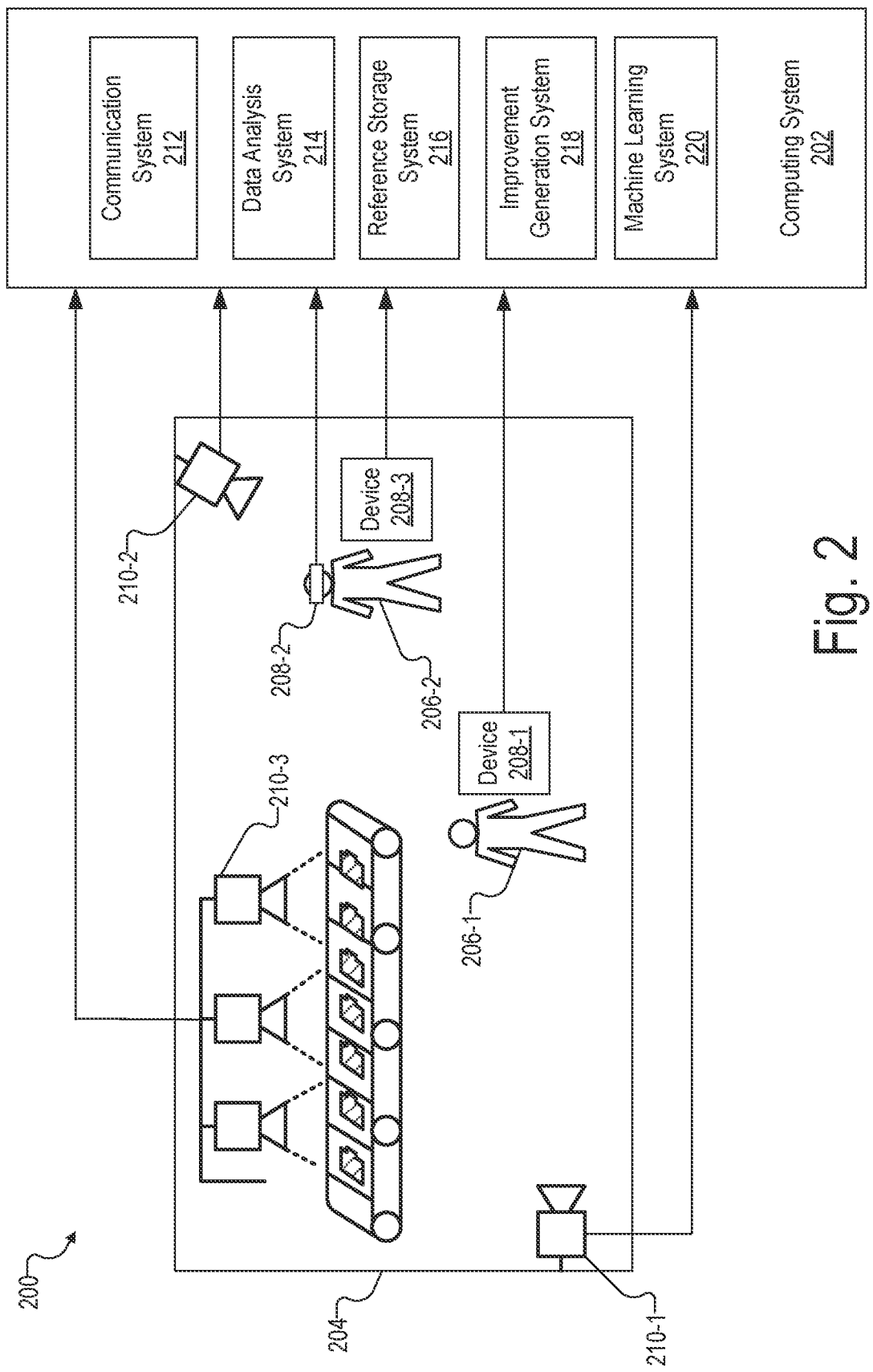
FIGS. 2-4 illustrate exemplary configurations of systems within which the computer system of FIG. 1 may operate to perform machine vision assisted task optimization according to principles described herein.

System 100 may be configured to perform machine vision assisted task optimization operations in various scenarios and contexts. For example, FIG. 2 shows an exemplary configuration 200 of a system within which a computing system 202 (e.g., an implementation of system 100) may operate to perform machine vision assisted task optimization in an industrial environment. An industrial environment may include any environment that is associated with and/or related to any industrial process, such as manufacturing processes, warehousing processes, fulfillment processes, transportation processes (e.g., physical goods delivery processes), processes associated with providing services (e.g., processes associated with operating a content delivery network, a data center, etc.), and/or any other industrial process. For example, the industrial environment shown in configuration 200 is a factory floor 204. While certain examples described herein relate to task optimization in an industrial environment, one or more principles described herein may apply to and be used in other environments such as office space environments, retail operation environments (e.g., a retail store), etc. A task may include any work or piece of work that furthers a process or goal associated with the environment (e.g., an industrial environment). A task may include a measurable objective and/or other measurable performance metrics to determine a performance level (e.g., an efficiency, an accuracy, a safety, etc.) of the task. In some examples, a task may be divided and/or combined into other tasks.

Configuration 200 shows computing system 202 configured to perform one or more machine vision assisted task optimization operations in relation to a factory floor 204 and operatives 206 (e.g., operatives 206-1 and 206-2) located on the factory floor 204. In certain examples, operatives 206 may include any person in the industrial environment, such as workers, employees, visitors, etc. and/or any machine in the industrial environment (e.g., machines controlled by workers, autonomous or semi-autonomous robots, etc.). Operatives 206 may have or otherwise be associated with various devices 208 (e.g., devices 208-1 through 208-3), which may be configured to provide data to computing system 202 that may be used for task optimization as described herein. Alternatively or additionally, factory floor 204 may include sensors 210 (e.g., sensors 210-1 through 210-3) that may provide data to computing system 202 for task optimization. In some examples, sensors 210 may further include devices 208 and/or sensors included in devices 208.

Computing system 202 may include various subsystems. For instance, as shown, computing system 202 includes a communication system 212, a data analysis system 214, a reference storage system 216, an improvement generation system 218, and a machine learning system 220. These subsystems may be implemented in any suitable manner by computing system 202, such as on a same computing device, a plurality of computing devices, as separate systems or as components of one or more combined systems, etc.

Devices 208 may include any suitable devices capable of communicating over a network and providing data. For example, devices 208 may include smartphones, tablets, laptops, smart watches, wearable devices, headsets, cameras, augmented reality (AR) devices, virtual reality (VR) devices, or any other suitable devices. In configuration 200, for instance, device 208-1 may be a smartphone associated with operative 206-1, device 208-2 may be an AR headset associated with operative 206-2, and device 208-3 may be a smart watch associated with operative 206-2.

Sensors 210 may include any component or device (e.g., including devices 208 and/or sensors of devices 208) configured to capture data of an environment of the component or device. Sensors 210 may be further configured to provide the data, such as by communicating over a network and/or providing the data to a device for communicating over the network. For example, sensors 210 may include image sensors (e.g., cameras), scanners (e.g., radio frequency identification (RFID) scanners, barcode scanners, etc.), thermal sensors, audio sensors (e.g., microphones), motion sensors, light sensors, force sensors, kinematic sensors, electromagnetic sensors, machine-specific sensors, any other suitable sensors, or any combination or sub-combination of such sensors.

Sensors 210 may capture data that may be used for task optimization. For example, such data may include location data, image data, video data, audio data, movement data, kinematics data, etc. associated with operatives 206 and/or tasks performed by operatives 206. Sensors 210 may further capture data such as product throughput data, product quality compliance data, machine performance data, and any other suitable data. Sensors 210 may provide the data to computing system 202.

Computing system 202 (e.g., communication system 212) may access (e.g., receive, retrieve, etc.) the data captured by sensors 210. Communication system 212 may be implemented in any manner suitable for receiving and sending data. For example, communication system 212 may be implemented using technologies such as cellular network technologies, MEC server communication technologies, Wi-Fi technologies, etc. and/or any combination of such technologies so that computing system 202 may be able to operate with multiple types of devices 208 and/or sensors 210 for machine vision assisted task optimization.

Computing system 202 (e.g., data analysis system 214) may determine, based on the data, one or more tasks being performed by one or more operatives 206. Data analysis system 214 may determine the tasks in any suitable manner. For instance, the data may include videos of operatives 206 performing the tasks. Data analysis system 214 (and/or machine learning system 220) may analyze the videos (e.g., using machine vision algorithms such as facial recognition, behavioral recognition, motion recognition, object detection, etc.) to determine the tasks, as well as to identify particular operatives 206 that are performing the tasks. Examples of such analyses are further described herein.

Data analysis system 214 may combine and/or correlate data from different sensors 210 to determine the tasks being performed. For example, the data from the sensors may include time information (e.g., timestamps) that data analysis system 214 may use to align and correlate different streams of data from different sensors 210. Additionally or alternatively, data analysis system 214 may receive the data from sensors 210 in real time or substantially real time and correlate the data streams based on when the data is received. Additionally or alternatively, data analysis system 214 may correlate different data streams based on operatives 206 identified in the data and/or associated with devices 208 and/or sensors 210. Data analysis system 214 may combine and/or correlate the data in any suitable manner, as described further herein.

Computing system 202 may access a reference video associated with a task being performed by operatives 206. For instance, reference storage system 216 may store training videos for various tasks that may be performed by operatives 206. Reference storage system 216 may access a particular training video associated with the task identified by data analysis system 214. The particular training video may be used as a reference video for the identified task.

Computing system 202 may compare the reference video with the data from sensors 210 associated with the performance of the task. Such data may include video data of one or more operatives 206 performing the task. Computing system 202 (e.g., machine learning system 220) may determine (e.g., based on the comparison) that there is a variance in the performance of the task by an operative 206 from a reference performance of the task in the reference video. The variance may include any difference in the performance of the task by the operative 206 relative to the reference performance of the task, such as a difference in a performance level of the task by the operative 206 relative to a performance level of the reference performance. In certain examples, computing system 202 may determine there is a variance with the performance of the task by the operative 206 relative to the reference performance of the task when the performance of the task by the operative 206 differs from the reference performance of the task by at least a defined threshold. Computing system 202 may determine the variance in any suitable manner, as further described herein.

Based on the variance, computing system 202 (e.g., improvement generation system 218 and/or machine learning system 220) may generate an output for improving (e.g., increasing a performance level of) the reference performance of the task and/or the performance of the task by one or more operatives 206. For example, computing system 202 may determine that a particular operative 206 is performing a task more efficiently than the reference performance of the task in the reference video. In response, improvement generation system 218 may generate a new reference video that is based on the performance of the task by the particular operative 206. Conversely, computing system 202 may determine that a particular operative 206 is performing a task unsafely relative to the reference performance of the task. In response, improvement generation system 218 may generate an output (e.g., a prompt, a suggestion, a video, etc.) for improving the performance of the task by the particular operative 206. Improvement generation system 218 may generate the output for improving the reference performance of the task and/or improving the performance of the task by operatives 206 in any suitable manner, as further described herein.

Figure 3:
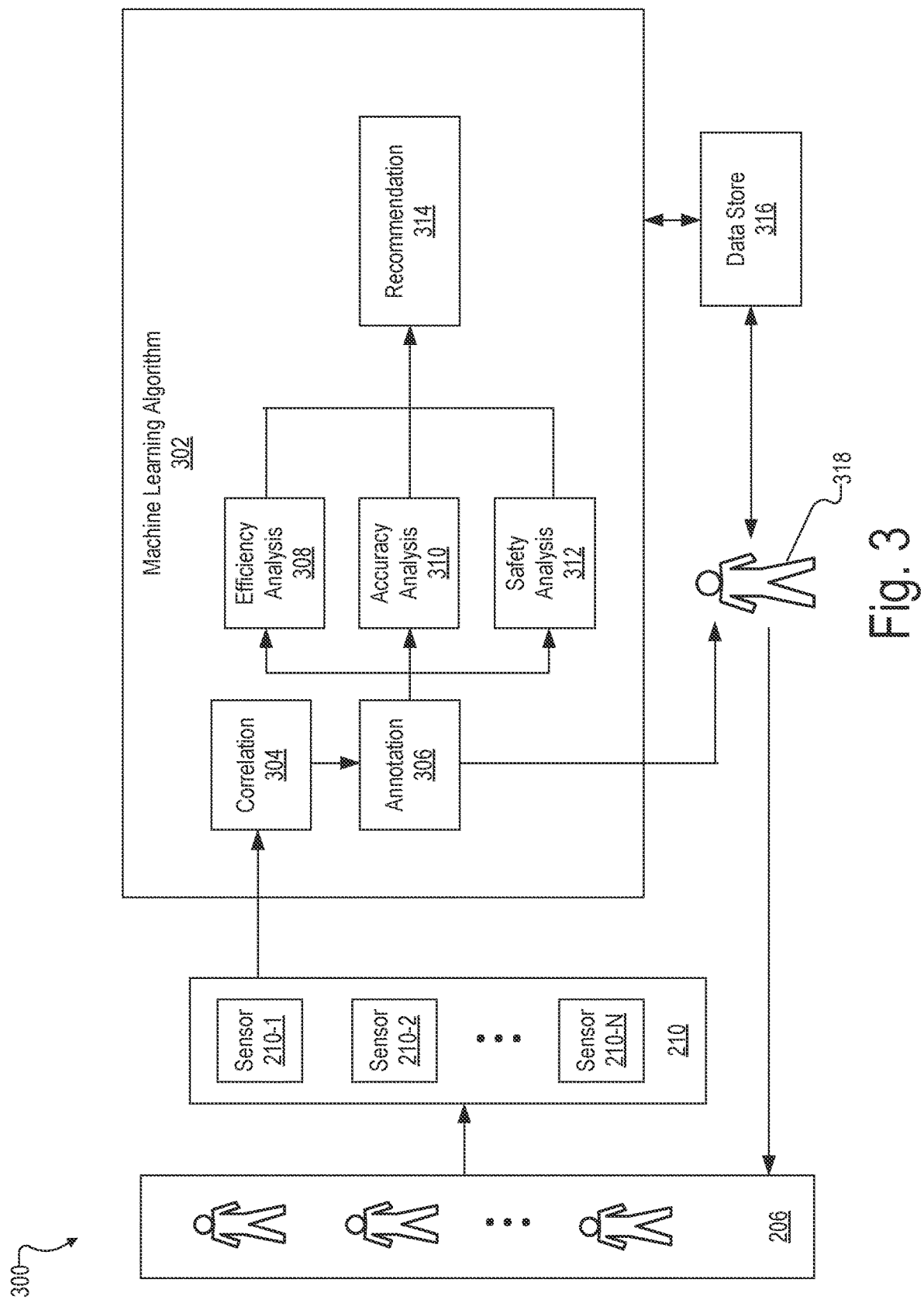

FIG. 3 illustrates an exemplary configuration 300 of a system within which computing system 202 may operate to perform machine vision assisted task optimization in an industrial environment (e.g., factory floor 204). For example, configuration 300 shows operatives (e.g., operatives 206) who may be performing tasks in the industrial environment. Data associated with the performance of the tasks may be captured and/or recorded by sensors (e.g., sensors 210). The data may include video data of operatives 206 performing the tasks. Sensors 210 may provide the data to computing system 202.

Computing system 202 may access the data and use one or more machine learning algorithms and/or models to analyze the data. For instance, configuration 300 shows an example machine learning algorithm 302. Machine learning algorithm 302 includes a correlation algorithm 304, an annotation algorithm 306, an efficiency analysis algorithm 308, an accuracy analysis algorithm 310, a safety analysis algorithm 312, and a recommendation algorithm 314. While machine learning algorithm 302 shows these particular algorithms, computing system 202 (e.g., machine learning system 220) may use additional algorithms, fewer algorithms, and/or any other suitable algorithms for machine vision assisted task optimization. Machine learning algorithm 302 may access a data store 316 that stores reference videos and/or outputs (e.g., recommendations, optimizations, optimized training videos, etc.) generated by machine learning algorithm 302. An administrator 318 (or any other suitable user) may access the outputs of computing system 202 and implement, reject, and/or provide additional input to the outputs to optimize task performance.

Correlation algorithm 304 may include any suitable algorithms for correlating and/or grouping data captured by sensors 210. For instance, correlation algorithm 304 may correlate data based on particular operatives 206, particular tasks, times (e.g., timestamps) associated with the data, and/or any other suitable correlation in any suitable manner. Additionally or alternatively, correlation algorithm 304 may be trained and/or configured to determine any groupings and/or classifications of the data that may be used for task optimization.

For example, correlation algorithm 304 may correlate data based on a particular operative 206 by identifying which of data captured by sensors 210 includes data associated with the particular operative 206. Such data may include videos depicting the particular operative 206, which may be determined using any suitable technologies, including facial recognition algorithms configured to identify the particular operative 206, object recognition algorithms configured to detect any suitable identifier associated with the particular operative 206, etc. Such data may further include data captured by sensors 210 associated with the particular operative 206, which may include devices 208 associated with the particular operative 206 (e.g., a device on and/or used by the particular operative 206, a sensor located in a location associated with the particular operative 206, a sensor associated with a task assigned to the particular operative 206 etc.). Such sensors 210 may provide data captured by the particular operative 206 and/or from a perspective of the particular operative 206. Additionally or alternatively, such sensors 210 may provide data associated with the task being performed by the particular operative 206. For instance, the data may include sensors on a machine that may measure outputs of the task, such as throughput, process flow, production flow, and/or quality measures of products produced by the task, manufacturing line results, etc.

Data associated with the particular operative 206 may further include location data of the particular operative 206. Such data may be captured by devices 208 and/or sensors 210 associated with the particular operative 206, such as smartphones, tablets, laptops, smartwatches, cameras, etc. Such devices 208 and/or sensors 210 may provide location data using any suitable technology, such as cellular network (e.g., 5G network) technologies, MEC server technologies, Wi-Fi 6 on 60 GHz technologies, Wi-Fi triangulation, imaging sensors (e.g., video) and machine vision, real-time kinetics, etc. Location data may further include location data of objects associated with the particular operative 206 and/or the task being performed by the particular operative 206. Object location data may be provided using any suitable technology, such cellular network technologies, Wi-Fi technologies, MEC server technologies, radio frequency identification (RFID) tags, Bluetooth, barcode scanning, image sensors and machine vision, real-time kinetics, etc.

In some examples, data may further include data received from other systems associated with the environment, such as quality assurance (QA) systems, enterprise resource planning (ERP) systems, warehouse management systems, time sheet/time recordation systems, etc. Such systems may provide additional data associated with the performance of the task, such as quality data, throughput data, process flow data, production flow data, data indicating completion of the task, data indicating time spent on the task, individual performance records data, etc. In some examples, some or all of such systems may be implemented by computing system 202. Correlation algorithm 304 may correlate some or all of these different streams of data and provide the correlated data to annotation algorithm 306.

Annotation algorithm 306 may annotate the correlated data in any suitable manner. For instance, annotation algorithm 306 may determine, based on the data, a task being performed by a particular operative 206. The task may be determined in any suitable manner. For example, annotation algorithm 306 may access data (e.g., from ERP systems, warehouse management systems, etc.) that correlate a particular task with the particular operative 206, particular objects detected in the data, a particular time of day, and/or a particular location, etc. Additionally or alternatively, annotation algorithm 306 may determine the task based on an output generated and/or produced by the task. Additionally or alternatively, annotation algorithm 306 may determine the task based on input provided by the particular operative 206, such as an indication that the particular operative 206 is starting, performing, and/or completing the task. For example, the particular operative 206 may provide a verbal cue as the task is being started, performed and/or completed, the particular operative 206 may provide an input to computing system 202 and/or another system (e.g., via a device 208 associated with the particular operative 206) as the task is being started, performed and/or completed, etc. Additionally or alternatively, annotation algorithm 306 may compare video of the particular operative 206 performing the task to reference videos (e.g., training videos stored in data store 316), determine which reference video is most similar, and identify a task associated with that reference video. Additionally or alternatively, annotation algorithm 306 may be trained in any suitable manner on data sets to detect features associated with each particular task.

Annotation algorithm 306 may provide the annotated data (e.g., a determination of the task) to efficiency analysis algorithm 308, accuracy analysis algorithm 310 and/or safety analysis algorithm 312. Annotation algorithm 306 may further provide output to administrator 318 that may include recommendations for improving performance of computing system 202 for task optimization. For example, if annotation algorithm 306 is unable to identify a task being performed by the particular operative 206, annotation algorithm 306 may provide a recommendation to add additional sensors 210 that may capture additional data that may enable annotation algorithm 306 to identify the task.

Efficiency analysis algorithm 308 may analyze the annotated data to determine an efficiency of the performance of the task by the particular operative 206 in any suitable manner. For instance, efficiency analysis algorithm 308 may determine, based on the annotated data, performance metrics of the performance of the task by the particular operative 206. Performance metrics may be determined based on the annotated data in any suitable manner. For example, efficiency analysis algorithm 308 may measure a quantity of output generated and/or produced by the particular operative 206 per unit measure of time. Additionally or alternatively, efficiency analysis algorithm 308 may use a behavioral recognition algorithm to determine how much time the particular operative 206 spends performing the task as opposed to other activities (e.g., talking, using a device, etc.). Additionally or alternatively, efficiency analysis algorithm 308 may measure any other suitable performance metrics, such as a speed of movement, etc.

Based on such performance metrics, efficiency analysis algorithm 308 may determine an efficiency of the performance of the task by the particular operative 206. Efficiency analysis algorithm 308 may compare the efficiency of the particular operative 206 performing the task to an efficiency of the performance of the task in the reference video to determine if there is a variance between the two. If efficiency analysis algorithm 308 determines that the efficiency of the particular operative 206 is higher than the reference efficiency (e.g., by a threshold amount), efficiency analysis algorithm 308 may output an indication as such (e.g., the efficiency level of the particular operative 206) to recommendation algorithm 314. Recommendation algorithm 314 may generate an output for improving the reference performance of the task (e.g., an optimized training video). Conversely, if efficiency analysis algorithm 308 determines that the efficiency of the particular operative 206 is lower than the reference efficiency (e.g., by a threshold amount), efficiency analysis algorithm 308 may output an indication as such to recommendation algorithm 314, which may generate an output to improve the performance of the particular operative 206.

Accuracy analysis algorithm 310 may also analyze the annotated data output by annotation algorithm 306 and determine an accuracy of the performance of the task by the particular operative 206 in any suitable manner. For instance, accuracy analysis algorithm 310 may determine, based on the annotated data, performance metrics related to a quality of the performance of the task by the particular operative 206 (e.g., performance metrics related to a quality of an output generated and/or produced by the particular operative 206). Such performance metrics may be determined in any suitable manner.

Based on such performance metrics, accuracy analysis algorithm 310 may determine an accuracy of the performance of the task by the particular operative 206. Accuracy analysis algorithm 310 may compare the accuracy of the particular operative 206 performing the task to an accuracy of the performance of the task in the reference video to determine if there is a variance in accuracy between the two (e.g., by a threshold amount). In a manner similar to efficiency analysis algorithm 308, accuracy analysis algorithm 310 may output an indication of any variance in accuracy to recommendation algorithm 314, which may generate, based on the variance, an output to improve the accuracy of the reference performance or the performance of the particular operative 206.

Similarly, safety analysis algorithm 312 may analyze the annotated data output by annotation algorithm 306 and determine a safety of the performance of the task by the particular operative 206. The safety of the performance of the task may be determined and/or quantified in any suitable manner. For example, safety analysis algorithm 312 may access a set of videos (e.g., stored in data store 316) that include a set of unsafe actions. Safety analysis algorithm 312 may compare the video data of performance of the task by the particular operative 206 to the set of unsafe actions to determine whether the particular operative 206 is performing any unsafe actions. Additionally or alternatively, safety analysis algorithm 312 may access individual performance records data, ERP data, and/or any other suitable data that may include a safety incident (e.g., an injury, a safety report, etc.) that indicates an unsafe action associated with the performance of the task by the particular operative 206. Additionally or alternatively, safety analysis algorithm 312 may detect a variance in the video data of the performance of the task by the particular operative 206 from the reference video and present the variance to administrator 318 for determining whether the variance is safe. If such a variance is designated as unsafe (e.g., by administrator 318, by data indicating a safety incident, etc.), safety analysis algorithm 312 may add the video data of the variance to the set of videos of unsafe actions for use in determining the safety of future performances of the task.

Based on the safety analysis, safety analysis algorithm 312 may output an indication to recommendation algorithm 314, which may generate, based on whether the performance of the task is designated as safe or unsafe, an output to improve the reference performance or the performance of the particular operative 206. For instance, if safety analysis algorithm 312 determines that the performance of the task by the particular operative 206 is unsafe, recommendation algorithm 314 may abstain from generating an optimized training video based on the performance of the task by the particular operative 206 even if the performance of the task by the particular operative 206 is more efficient than the reference performance of the task. Rather, recommendation algorithm 314 may generate an output that may improve the safety of the performance of the task by the particular operative 206. Conversely, if safety analysis algorithm 312 determines that the performance of the task by particular operative 206 is safer than the reference performance of the task (e.g., via input from administrator 318), recommendation algorithm 314 may generate an optimized training video based on the performance of the task by the particular operative 206. In some examples, an increased safety of the performance of the task may outweigh a decreased efficiency of the performance of the task.

As described, recommendation algorithm 314 may receive outputs from efficiency analysis algorithm 308, accuracy analysis algorithm 310, and/or safety analysis algorithm 312 and generate an output for improving a reference performance of a task and/or a performance of the task by a particular operative 206. For example, if the performance of the task by the particular operative 206 includes a variance from the reference performance of the task that includes a higher performance level, recommendation algorithm 314 may generate an optimized training video that may be used as a new reference video. The determining of the higher performance level may be performed in any suitable manner. For instance, recommendation algorithm 314 may weigh the outputs of efficiency analysis algorithm 308, accuracy analysis algorithm 310, and safety analysis algorithm 312 in any suitable combination and/or weighting to determine whether a performance of the task has a higher or lower performance level compared to a reference performance of the task. As one example, any increase in efficiency and/or accuracy that meets some predetermined threshold while remaining a safe performance of the task may be considered a higher performance level.

Recommendation algorithm 314 may generate outputs for improving the reference performance of the task in any suitable manner. For instance, recommendation algorithm 314 may generate a new training video that uses video data of the particular operative 206 performing the task. For example, recommendation algorithm 314 may process the video data of the particular operative 206 to generate a training video that is visually similar to the reference video. For example, the reference video may be a training video that shows the reference performance of the task broken down into steps, repeating certain steps, showing different angles, explaining certain steps, etc. As the video data may be captured by a plurality of sensors 210, the video data may include similar angles and may be processed to generate the new training video to mimic the reference video, replacing the reference performance of the task with the performance of the task by the particular operative 206. Additionally or alternatively, the video data may be processed to focus on the particular operative 206. For example, the video data may include other operatives performing other tasks and/or any other scenery that may not be relevant to the performing of the task by the particular operative 206. Recommendation algorithm 314 may process the video to isolate and/or focus on the particular operative 206.

Additionally or alternatively, recommendation algorithm 314 may determine a portion of the performance of the task by the particular operative 206 that constitutes the variance between the performance of the task by the particular operative 206 and the reference performance. For instance, the particular operative 206 may perform one or more of the steps of the task differently from the reference performance, while other steps are performed substantially similarly to the reference performance. In such an instance, recommendation algorithm 314 may generate a new training video that combines portions of the reference video with the video data corresponding to the portions of the performance of the task by the particular operative 206 that vary from the reference performance.

Conversely, if the performance of the task by the particular operative 206 includes a variance from the reference performance that includes a lower performance level, recommendation algorithm 314 may generate an output that improves or is configured to facilitate improvement of the performance of the task by the particular operative 206. Such outputs may be generated in any suitable manner. For example, recommendation algorithm 314 may determine a portion of the performance of the task by the particular operative 206 that constitutes the variance between the performance of the task by the particular operative 206 from the reference performance and present data representing the portion of the reference performance to the particular operative 206. Additionally or alternatively, recommendation algorithm 314 may determine how the particular operative 206 is varying in the performance of the task from the reference task and present a suggestion of how to conform the performance of the task by the particular operative 206 closer to the reference performance.

Recommendation algorithm 314 may present outputs to administrator 318, who may approve, reject, and/or edit the outputs. Administrator 318 may present the outputs to operatives 206 as appropriate. In some examples, recommendation algorithm 314 may present outputs directly to operatives 206.

In some examples, recommendation algorithm 314 may generate an output for improving the reference performance and also generate an output for improving the performance of the task by the particular operative 206. For instance, a first portion of the performance of the task by the particular operative 206 may be of a higher performance level, while a second portion of the performance of the task by the particular operative 206 may be of a lower performance level. In such an instance, recommendation algorithm 314 may generate an output corresponding to the first portion for improving the reference performance of the task while generating an output corresponding to the second portion for improving the performance of the task by the particular operative 206.

In some examples, machine learning algorithm 302 may perform steps iteratively, such as with one or more of correlation algorithm 304, annotation algorithm 306, efficiency analysis algorithm 308, accuracy analysis algorithm 310, safety analysis algorithm 312, and recommendation algorithm 314. For example, efficiency analysis algorithm 308 and/or accuracy analysis algorithm 310 may determine that a particular task is being performed more efficiently and/or more accurately based on one or more particular data streams (e.g., throughput data, warehouse management data, etc.), which may be correlated and/or annotated by correlation algorithm 304 and/or annotation algorithm 306. Based on such a determination, correlation algorithm 304 and/or annotation algorithm 306 may further correlate and/or annotate data associated with the performance of the task.

Based on the correlation and/or annotation, machine learning algorithm 302 may determine whether a particular operative 206 (and/or a set of particular operatives 206) is generating a particular variance from the reference performance of the task that is a cause of the higher performance level (e.g., as opposed to environmental factors, such as location, time of day, input material, etc.). For example, machine learning algorithm 302 may analyze data corresponding to a plurality of repetitions of the performance of the task by the particular operative 206 (e.g., the particular operative 206 may perform a particular task multiple times). Machine learning algorithm 302 may determine a variance that the particular operative 206 performs and analyze fluctuations in the performance of the variance (e.g., by analyzing and comparing video data of the repetitions) and how such fluctuations affect the performance level of the task. Based on such an analysis, machine learning algorithm 302 may determine whether the variance is a cause of the higher performance level. If machine learning algorithm 302 is unable to determine a variance that is generating the higher performance level, machine learning algorithm 302 (e.g., annotation algorithm 306) may generate an output for administrator 318 providing possible suggestions for adding additional sensors 210 that may enable machine learning algorithm 302 to determine the variance.

In certain embodiments, computing system 202 may be configured to analyze production or output based on performance of one or more operatives 206 and determine if this type of performance varies by at least a defined threshold from a reference performance. In response to computing system 202 determining that this type of performance varies by at least the defined threshold from the reference performance, computing system 202 may perform one or more additional operations, which may include further analysis, such as vision-based analysis of performance. For example, computing system 202 may perform any of the vision assisted task optimization operations described herein.

A particular task performed by operatives 206 may be subdivided into smaller tasks and/or combined with other tasks into larger tasks. Thus, in some examples, computing system 202 may also generate output for optimizing performance of a larger task by allocating resources across smaller tasks. For instance, computing system 202 may determine, based on data captured by sensors 210, that a first operative (e.g., operative 206-1) has completed a first task. Computing system 202 may determine a second task to assign to operative 206-1 and provide an instruction to operative 206-1 (e.g., via device 208-1 associated with operative 206-1) to perform the second task. The second task may be determined in any suitable manner, such as based on a completion level of the second task, an importance level of the second task, a throughput level of the second task, a similarity of the second task to the first task, a proximity of the second task to the first task, etc. In such a manner, computing system 202 may perform task orchestration that may optimize performance of a larger task that includes the smaller tasks and/or the environment of the tasks.

While data captured by sensors 210 has been described to include video data, in some examples, computing system 202 may determine a variance in a performance of a task by a particular operative 206 based on other data streams (e.g., location data, throughput data, kinematic data, object location data, etc.). For instance, computing system may access data other than video data associated with performance of a task by operatives 206. Such data may be compared to a set of reference data that may include similar types of data (e.g., data other than video data). Based on such a comparison, computing system 202 may determine a variance, and based on the variance, computing system 202 may generate an output for improving the performance of the reference performance and/or the performance of the task by the particular operative 206.

Figure 4:
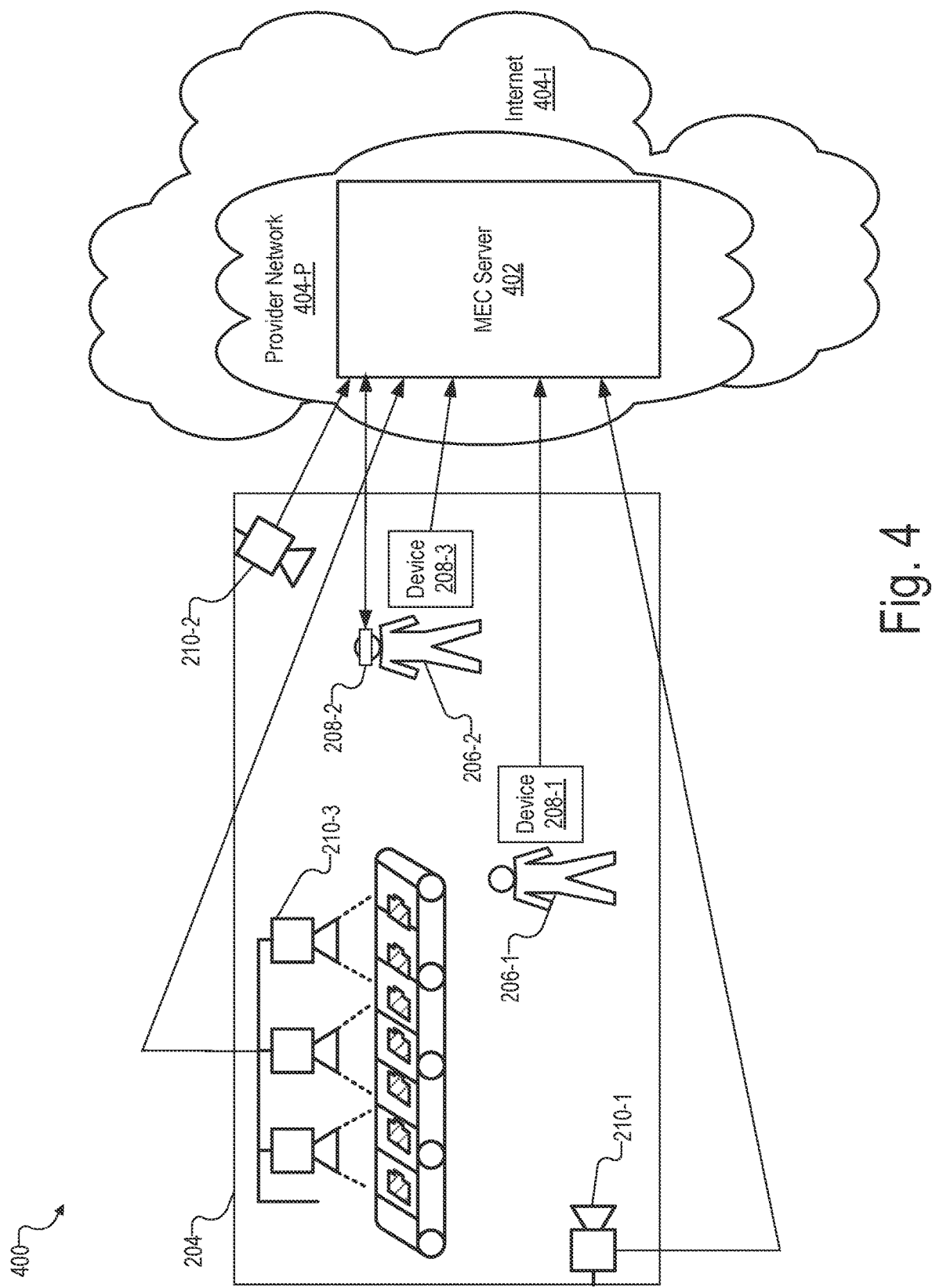

FIG. 4 shows another exemplary configuration 400 of a system in which computing system 202 is implemented using a MEC server 402 integrated within a network 404 (including a provider network 404-P portion and an Internet 404-1 portion). Implementing computing system 202 with MEC server 402 may allow computing system 202 to perform resource-intensive computing tasks (e.g., communicating with a plurality of devices 208 and/or sensors 210, locating operatives 206 and/or objects associated with tasks, analyzing a plurality of data streams, performing machine learning algorithms, etc.) with a very low latency.

Further, such an implementation may allow computing system 202 to generate volumetric data based on video data captured by sensors 210. Such volumetric data combined with location data of operatives 206 and/or devices 208 may allow computing system 202 to generate AR and/or VR content that presents content of reference videos (e.g., training videos) and/or captures content of the performance of the task by operatives 206. For instance, computing system 202 may communicate with device 208-2, an AR headset, for presenting content of a training video to operative 206-2. Additionally or alternatively, device 208-2 may capture video data that shows a perspective of operative 206-2 from which volumetric data is generated to generate AR and/or VR content for other operatives 206 (e.g., based on computing system 202 determining that operative 206-2 is performing a task at a higher performance level than a reference performance of the task).

In some examples of configuration 400, reference videos and/or volumetric data generated based on the reference videos may be stored in servers remote from factory floor 204 (e.g., in Internet 404-1 portion) so that such data may be accessible to other locations (e.g., other factories, other industrial environments, etc.). Additionally or alternatively, such data may be stored locally or nearby factory floor 204 (e.g., in MEC server 402 and/or servers in provider network 404-P).

In certain embodiments, computing system 202 may generate volumetric data based on video data captured by sensors 210 and use the volumetric data for one or more of the operations described herein. For example, sensor data may include color and depth data that may be used to generate volumetric data of an environment such as a factory floor. Computing system 202 may use the volumetric data for tracking physical locations, orientations, poses, etc. of one or more objects in the environment, such as the locations, orientations, poses, etc. of one or more operatives 206 on a factory floor. Additionally or alternatively, computing system 202 may use the volumetric data to generate new video content. For example, to generate a new reference video segment, computing system 202 may generate a volumetric video segment that may be used to generate and provide VR or AR content. As another example, to generate a new reference video segment, computing system 202 may use a volumetric video segment to render a two-dimensional video from a select viewpoint, which may include a virtual viewpoint that is different from any viewpoint of sensors 210. For instance, computing system 202 may identify a viewpoint of a reference video to be replaced by a new reference video and use the identified viewpoint of the reference video to determine a viewpoint to use to render the new reference video from the volumetric data. The viewpoint used to render the new reference video may be determined to provide the same or a similar viewpoint to promote viewpoint consistency between the reference video and the new reference video.

Figure 5:
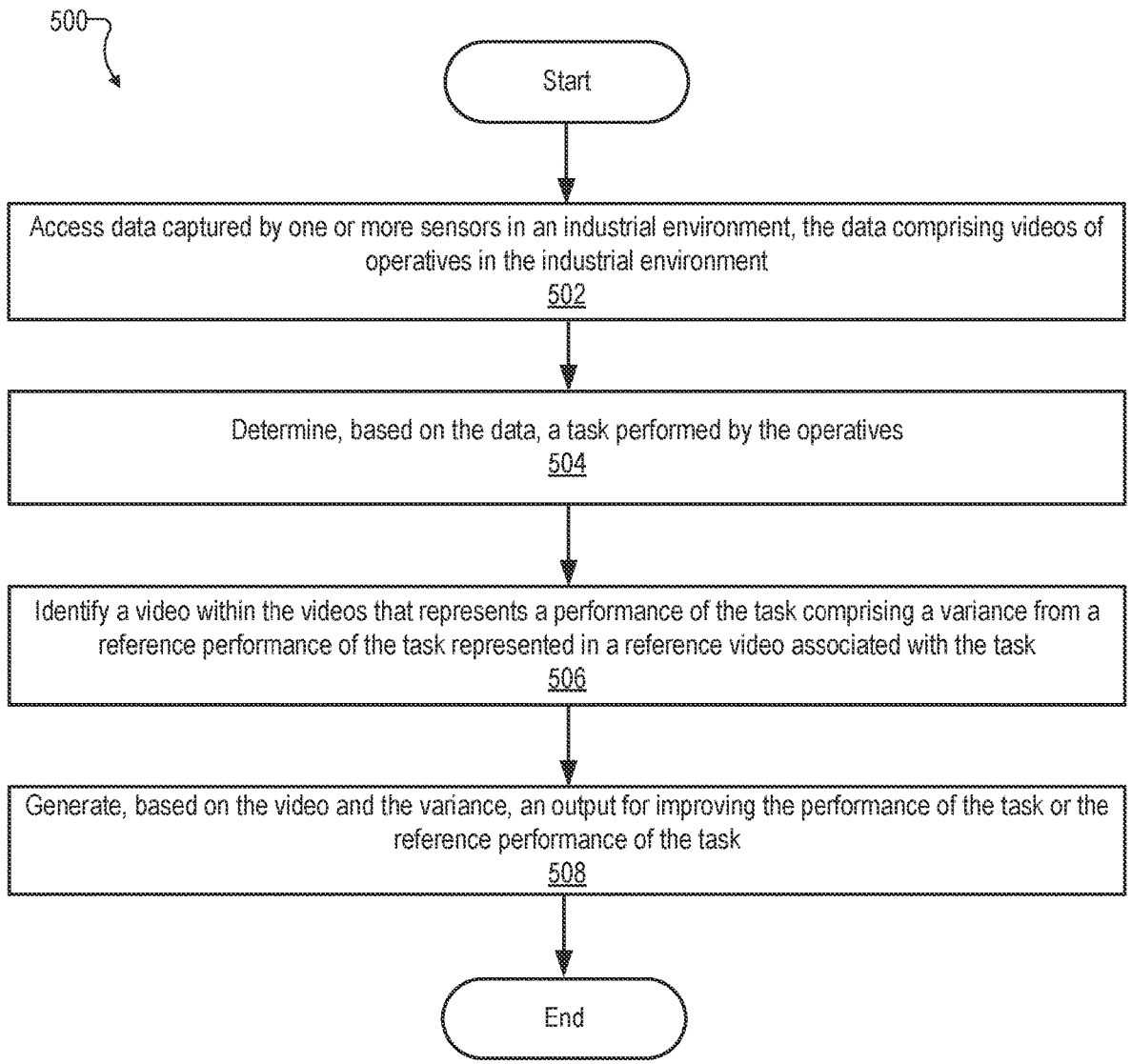
FIGS. 5-6 illustrate exemplary methods for machine vision assisted task optimization according to principles described herein.

FIG. 5 illustrates an exemplary method 500 for machine vision assisted task optimization. While FIG. 5 illustrates exemplary operations according to one embodiment, other embodiments may omit, add to, reorder, and/or modify any of the operations shown in FIG. 5. One or more of the operations shown in FIG. 5 may be performed by system 100, any components included therein, and/or any implementation thereof.

In operation 502, a computing system accesses data captured by one or more sensors in an industrial environment, the data comprising videos of operatives in the industrial environment. Operation 502 may be performed in any of the ways described herein.

In operation 504, the computing system determines, based on the data, a task performed by the operatives. Operation 504 may be performed in any of the ways described herein.

In operation 506, the computing system identifies a video within the videos that represents a performance of the task comprising a variance from a reference performance of the task represented in a reference video associated with the task. Operation 506 may be performed in any of the ways described herein.

In operation 508, the computing system generates, based on the video and the variance, an output for improving the performance of the task or the reference performance of the task. Operation 508 may be performed in any of the ways described herein.

Figure 6:
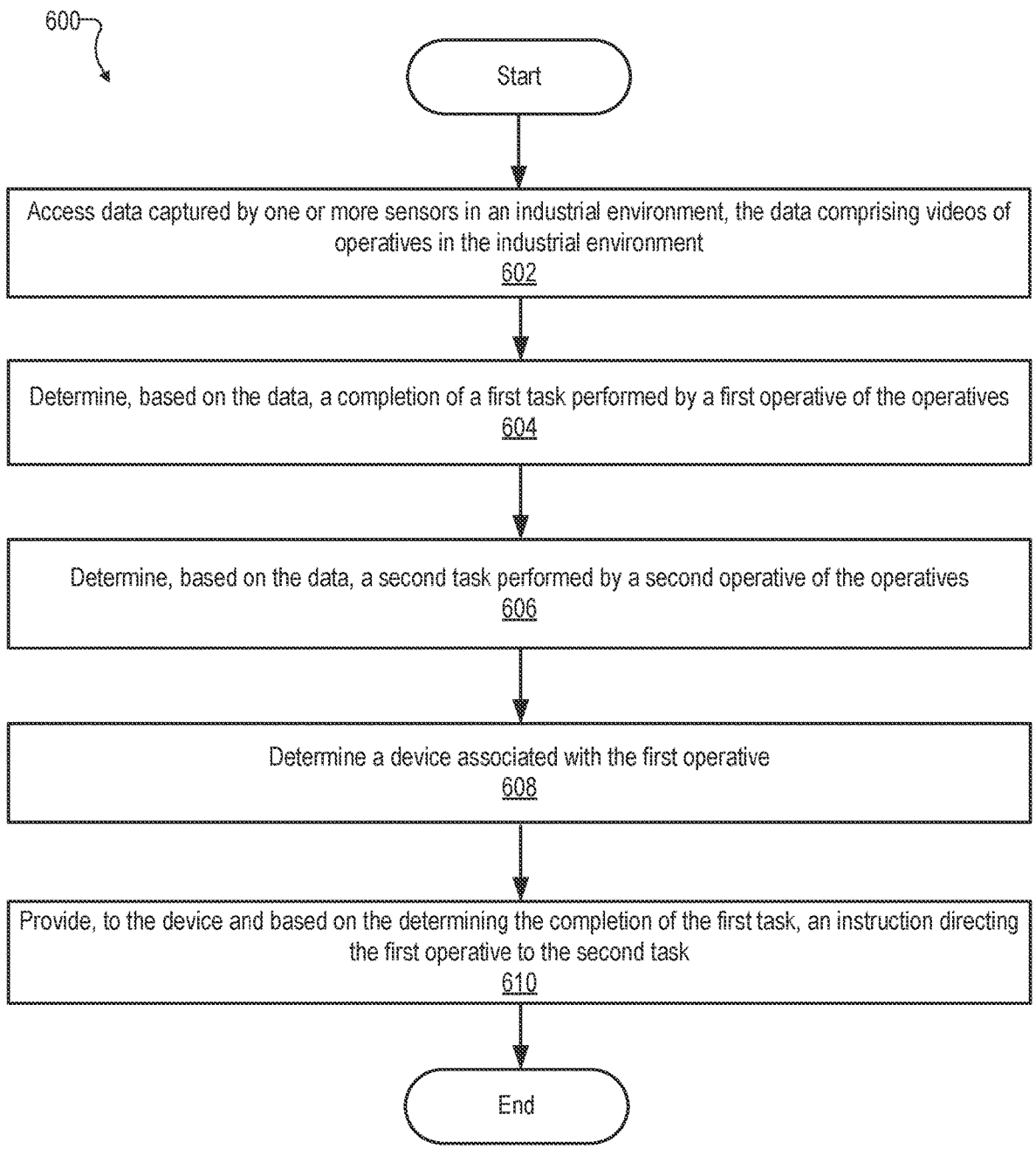

FIG. 6 illustrates another exemplary method 600 for machine vision assisted task optimization. While FIG. 6 illustrates exemplary operations according to one embodiment, other embodiments may omit, add to, reorder, and/or modify any of the operations shown in FIG. 6. One or more of the operations shown in FIG. 6 may be performed by system 100, any components included therein, and/or any implementation thereof.

In operation 602, a computing system accesses data captured by one or more sensors in an industrial environment, the data comprising videos of operatives in the industrial environment. Operation 602 may be performed in any of the ways described herein.

In operation 604, the computing system determines, based on the data, a completion of a first task performed by a first operative of the operatives. Operation 604 may be performed in any of the ways described herein.

In operation 606, the computing system determines, based on the data, a second task performed by a second operative of the operatives. Operation 606 may be performed in any of the ways described herein.

In operation 608, the computing system determines a device associated with the first operative. Operation 608 may be performed in any of the ways described herein.

In operation 610, the computing system provides, to the device and based on the determining the completion of the first task, an instruction directing the first operative to the second task. Operation 610 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 7:
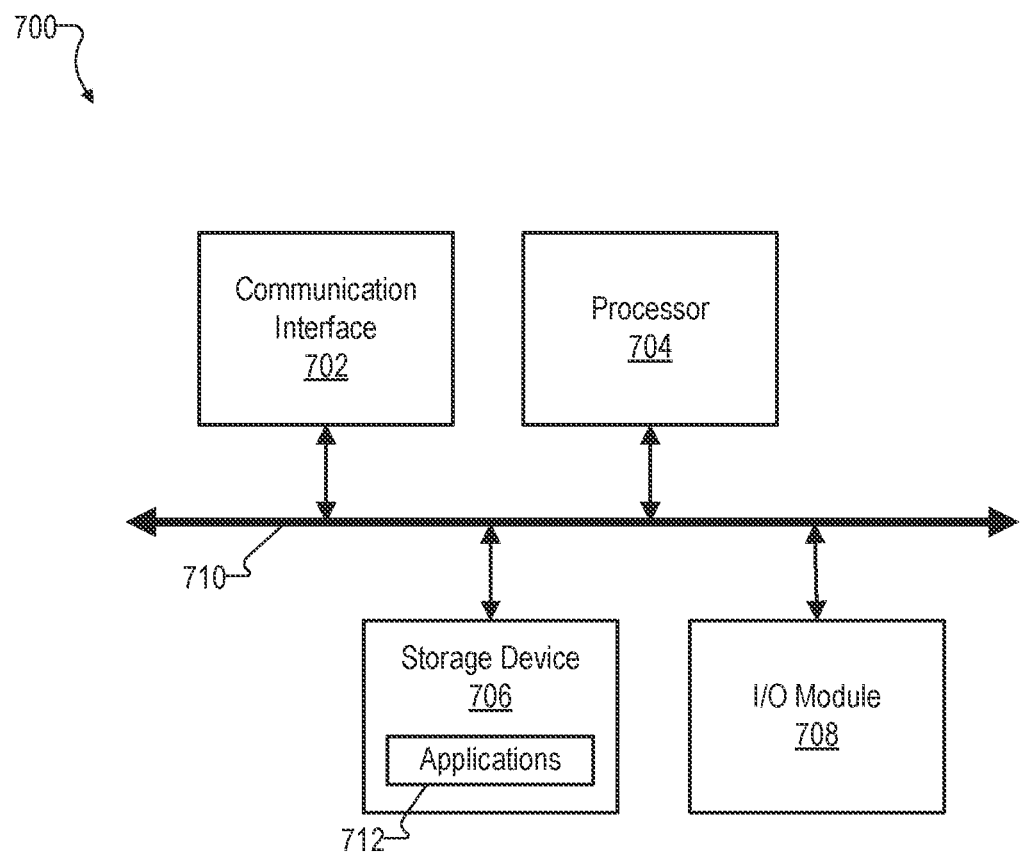
FIG. 7 illustrates an exemplary computing device according to principles described herein.

FIG. 7 illustrates an exemplary computing device 700 that may be specifically configured to perform one or more of the processes described herein. As shown in FIG. 7, computing device 700 may include a communication interface 702, a processor 704, a storage device 706, and an input/output ("I/O") module 708 communicatively connected via a communication infrastructure 710. While an exemplary computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 or other computer-executable instructions such as may be stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 706. For example, data representative of one or more executable applications 712 configured to direct processor 704 to perform any of the operations described herein may be stored within storage device 706. In some examples, data may be arranged in one or more databases residing within storage device 706.

I/O module 708 may include one or more I/O modules configured to receive user input and provide user output. One or more I/O modules may be used to receive input for a single virtual experience. I/O module 708 may include any hardware, firmware, software, or combination thereof supportive of input and output capabilities. For example, I/O module 708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 700. For example, one or more applications 712 residing within storage device 706 may be configured to direct processor 704 to perform one or more processes or functions associated with processing facility 104 of system 100. Likewise, storage facility 102 of system 100 may be implemented by or within storage device 706.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a memory storing instructions; and
a processor communicatively coupled with the memory and configured to execute the instructions to:
  access data captured by one or more sensors in an industrial environment, the data comprising videos of operatives in the industrial environment and volumetric data of the operatives associated with the videos;
  determine, based on the data and using one or more machine vision algorithms, a task performed by the operatives;
  identify a video within the videos that represents a performance of the task comprising a variance from a reference performance of the task by a reference operative represented in a reference video associated with the task;
  determine, using the one or more machine vision algorithms, a portion of the performance of the task that constitutes the variance;
  render, based on the volumetric data and the portion of the performance of the task that constitutes the variance, a new reference video segment comprising the task being performed with the variance and representing a rendered viewpoint identified in the reference video and different from any viewpoint of the one or more sensors;
  generate, based on the video and the new reference video segment, a modified reference video replacing at least a portion of the reference video representing the reference performance of the task with the new reference video segment comprising the variance, the modified reference video comprising at least one of virtual reality (VR) or augmented reality (AR) content representing the rendered viewpoint; and output the modified reference video for display on a VR or AR device.

2. The system of claim 1, wherein:
the variance comprises a higher performance level relative to the reference performance of the task.

3. The system of claim 2, wherein the higher performance level comprises:
an increase in at least one of an efficiency or an accuracy in the performance of the task; and
at least a same level of safety in the performance of the task.

4. The system of claim 2, wherein:
the reference video shows reference performance of the task in a plurality of steps; and
the generating the modified reference video comprises processing the video to show the performance of the task in the plurality of steps.

5. The system of claim 1, wherein:
an additional variance comprises a lower performance level of a portion of the performance of the task relative to the reference performance of the task; and
the processor is configured to further execute the instructions to generate, based on the video and the reference video, a suggestion for conforming the performance of the task closer to the reference performance of the task.

6. The system of claim 5, wherein the processor is further configured to execute the instructions to:
determine a device associated with a particular operative performing the task; and
provide, to the device, the suggestion.

7. The system of claim 1, wherein the determining the task performed by the operatives comprises grouping, based on each operative, the data captured by the one or more sensors.

8. The system of claim 7, wherein the grouping, based on each operative, the data captured by the one or more sensors comprises grouping based on each operative using a facial recognition algorithm.

9. The system of claim 1, wherein the processor is further configured to execute the instructions to:
identify, in the video, a particular operative of the operatives who is performing the task; and
determine, based on the data and the reference video, that the variance is generated by the particular operative.

10. The system of claim 1, wherein
the volumetric data comprises color and depth data.

11. A method comprising:
accessing, by a computing system, data captured by one or more sensors in an industrial environment, the data comprising videos of operatives in the industrial environment and volumetric data of the operatives associated with the videos;
determining, by the computing system and based on the data and using one or more machine vision algorithms, a task performed by the operatives;
identifying, by the computing system, a video within the videos that represents a performance of the task comprising a variance from a reference performance of the task by a reference operative represented in a reference video associated with the task;
determining, by the computing system using the one or more machine vision algorithms, a portion of the performance of the task that constitutes the variance;

render, by the computing system and based on the volumetric data and the portion of the performance of the task that constitutes the variance, a new reference video segment comprising the task being performed with the variance and representing a rendered viewpoint identified in the reference video and different from any viewpoint of the one or more sensors;
generating, by the computing system and based on the video and the new reference video segment, a modified reference video replacing at least a portion of the reference video representing the reference performance of the task with the new reference video segment comprising the variance, the modified reference video comprising at least one of virtual reality (VR) or augmented reality (AR) content representing the rendered viewpoint; and
outputting the modified reference video for display on a VR or AR device.

12. The method of claim 11, wherein:
an additional variance comprises a lower performance level of a portion of the performance of the task relative to the reference performance of the task; and
the method further comprises generating, based on the video and the reference video, a suggestion for conforming the performance of the task closer to the reference performance of the task.

13. The method of claim 12, further comprising:
determining, by the computing system, a device associated with a particular operative performing the task; and
providing, by the computing system and to the device, the suggestion.

14. The method of claim 11, further comprising:
identifying, by the computing system, in the video, a particular operative of the operatives who is performing the task; and
determining, by the computing system and based on the data and the reference video, that the variance is generated by the particular operative.

15. The method of claim 11, wherein:
the reference video shows reference performance of the task in a plurality of steps; and
the generating the modified reference video comprises processing the video to show the performance of the task in the plurality of steps.

16. The method of claim 11, wherein the determining the task performed by the operatives comprises grouping, based on each operative, the data captured by the one or more sensors.

17. A non-transitory computer-readable medium storing instructions that, when executed, direct a processor of a computing device to perform a process comprising:
accessing data captured by one or more sensors in an industrial environment, the data comprising videos of operatives in the industrial environment and volumetric data of the operatives associated with the videos;
determining, based on the data and using one or more machine vision algorithms, a task performed by the operatives;
identifying a video within the videos that represents a performance of the task comprising a variance from a reference performance of the task by a reference operative represented in a reference video associated with the task;
determining, using the one or more machine vision algorithms, a portion of the performance of the task that constitutes the variance;

render, based on the volumetric data and the portion of the performance of the task that constitutes the variance, a new reference video segment comprising the task being performed with the variance and representing a rendered viewpoint identified in the reference video and different from any viewpoint of the one or more sensors;

generating, based on the video and the new reference video segment, a modified reference video replacing at least a portion of the reference video representing the reference performance of the task with the new reference video segment comprising the variance, the modified reference video comprising at least one of virtual reality (VR) or augmented reality (AR) content representing the rendered viewpoint; and outputting the modified reference video for display on a VR or AR device.

18. The computer-readable medium of claim 17, wherein the process further comprises:

identifying in the video, a particular operative of the operatives who is performing the task; and determining, based on the data and the reference video, that the variance is generated by the particular operative.

19. The computer-readable medium of claim 17, wherein:

the reference video shows reference performance of the task in a plurality of steps; and the generating the modified reference video comprises processing the video to show the performance of the task in the plurality of steps.

20. The computer-readable medium of claim 17, wherein:

an additional variance comprises a lower performance level of a portion of the performance of the task relative to the reference performance of the task; and the process further comprises generating, based on the video and the reference video, a suggestion for conforming the performance of the task closer to the reference performance of the task.

* * * * *